US006139674A

United States Patent [19]
Markham et al.

[11] Patent Number: 6,139,674
[45] Date of Patent: Oct. 31, 2000

[54] METHOD OF MAKING AN INK JET PRINTHEAD FILTER BY LASER ABLATION

[75] Inventors: Roger G. Markham, Webster; John R. Andrews, Fairport; Gary A. Kneezel, Webster, all of N.Y.

[73] Assignee: Xerox Corporation, Stamford, Conn.

[21] Appl. No.: 08/926,692

[22] Filed: Sep. 10, 1997

[51] Int. Cl.[7] .............................. B32B 31/00; B41J 2/00; G01D 15/00

[52] U.S. Cl. ...................... 156/252; 156/256; 156/272.8; 347/93; 216/27; 216/56; 216/65; 216/94; 210/500.21; 83/39

[58] Field of Search ................................ 347/93; 216/56, 216/94, 27, 65; 210/500.25, 500.27, 500.21; 156/252, 253, 256, 272.8; 204/192.1; 83/39, 49, 52

[56] References Cited

U.S. PATENT DOCUMENTS

| | | | |
|---|---|---|---|
| Re. 32,572 | 1/1988 | Hawkins et al. | 156/626 |
| 4,678,529 | 7/1987 | Drake et al. | 156/234 |
| 4,774,530 | 9/1988 | Hawkins | 347/93 |
| 4,864,329 | 9/1989 | Kneezel et al. | 347/93 |
| 4,923,608 | 5/1990 | Flottmann et al. | 210/500.25 |
| 5,124,717 | 6/1992 | Campanelli et al. | 347/93 |
| 5,141,596 | 8/1992 | Hawkins et al. | 216/2 |
| 5,154,815 | 10/1992 | O'Neill | 205/75 |
| 5,204,690 | 4/1993 | Lorenze, Jr. et al. | 347/93 |
| 5,662,844 | 9/1997 | Goto et al. | 264/49 |
| 5,742,314 | 4/1998 | Hayes | 347/93 |

FOREIGN PATENT DOCUMENTS 0 670 221 A2 9/1995 European Pat. Off. .

*Primary Examiner*—Linda L. Gray

[57] ABSTRACT

A method for fabricating a filter element to prevent contaminants from entering an ink supply inlet of an ink jet printhead. The filter is formed by laser ablation process in which output laser radiation is directed through a mask system or light transmitting system to create a filter hole pattern in a thin film. Slightly tapered holes are formed in the film, and the formed filter element is laminated to the ink supply inlet. The tapered holes provide improved flow/impedance and add increased structural strength.

2 Claims, 8 Drawing Sheets

METHOD OF MAKING AN INK JET PRINTHEAD FILTER BY LASER ABLATION

BACKGROUND OF THE INVENTION AND MATERIAL DISCLOSURE STATEMENT

The invention relates to ink jet printers and, more particularly, to a thermal ink jet printhead having a filter over its ink inlet and a laser ablation fabrication process for forming the filter.

A typical thermally actuated drop-on-demand ink jet printing system uses thermal energy pulses to produce vapor bubbles in an ink-filled channel that expels droplets from the channel orifices of the printing system's printhead. Such printheads have one or more ink-filled channels communicating at one end with a relatively small ink supply chamber (or reservoir) and having an orifice at the opposite end, also referred to as the nozzle. A thermal energy generator, usually a resistor, is located within the channels near the nozzle at a predetermined distance upstream therefrom. The resistors are individually addressed with a current pulse to momentarily vaporize the ink and form a bubble which expels an ink droplet. A meniscus is formed at each nozzle under a slight negative pressure to prevent ink from weeping therefrom.

Some of these thermal ink jet printheads are formed by mating two silicon substrates. One substrate contains an array of heater elements and associated electronics (and is thus referred to as a heater plate), while the second substrate is a fluid directing portion containing a plurality of nozzle-defining channels and an ink inlet for providing ink from a source to the channels (thus, this substrate is referred to as a channel plate). The channel plate is typically fabricated by orientation dependent etching methods.

Droplet directionality of a droplet expelled from these printheads can be significantly influenced by extrinsic particles finding their way into the printhead channels.

The dimensions of ink inlets to the die modules, or substrates, are much larger than the ink channels; hence, it is desirable to provide a filtering mechanism for filtering the ink at some point along the ink flow path from the ink manifold or manifold source to the ink channel. Any filtering technique should also minimize air entrapment in the ink flow path.

Various techniques are disclosed in the prior art. U.S. Pat. Nos. 5,124,717, 5,141,596, 5,154,815, and 5,204,690 disclose fabrication techniques for forming filters integral to the printhead using patterned etch resistant masks. This technique has the disadvantage of flow restriction due to the proximity to single channels and poor yields due to defects near single channels.

U.S. Pat. No. 4,864,329 to Kneezel et al. discloses a thermal ink jet printhead having a flat filter placed over the inlet thereof by a fabrication process which laminates a wafer size filter to the aligned and bonded wafers containing a plurality of printheads. The individual printheads are obtained by a sectioning operation, which cuts through the two or more bonded wafers and the filter. The filter may be a woven mesh screen or preferably a nickel electroformed screen with predetermined pore size. Since the filter covers one entire side of the printhead, a relatively large contact area prevents delamination and enables convenient leak-free sealing. Electroformed screen filters having pore size which is small enough to filter out particles of interest result in filters which are very thin and subject to breakage during handling or wash steps. Also, the preferred nickel embodiment is not compatible with certain inks resulting in filter corrosion. Finally, the choice of materials is limited when using this technique. Woven mesh screens are difficult to seal reliably against both the silicon ink inlet and the corresponding opening in the ink manifold. Further, plating with metals such as gold to protect against corrosion is costly.

SUMMARY OF THE INVENTION

It is, therefore, desirable to provide a filter which will:

1) prevent particulate matter of a size sufficient to block channels from entering the printhead channels;
2) improve ink droplet directionality in an ink jet printhead.
3) having increased strength to enable handling and processing steps without breakage;
4) which will minimize air entrapment along the ink flow path and
5) which can be effectively applied to a plurality of substrates during the fabrication process.

To achieve the foregoing, a laser-ablatable material is used as a filter which is aligned and bonded to the ink inlet side of a substrate. In a preferred embodiment, a thin polymer film is ablated through a mask or screen to produce a fine array of small holes in the ink inlet areas. The film is laminated to the channel substrate to form a filter over the ink inlet or inlets. The substrate is then diced to form individual die printhead modules, each with an ink inlet or inlets having a filter.

In an alternate embodiment, the polymer film is first attached to the substrate followed by dicing, followed by small-hole laser ablation.

In a still further embodiment, the laser-ablated filter is made as part of a tape seal joining the die module to a manifold in an ink supply cartridge.

In all of the above embodiments, the laser ablation process may be controlled to produce tapered holes through the film. Tapered holes enable the use of a thicker film with less flow impedance augmenting the strength of the filter to withstand handling and processing.

More particularly, the present invention relates to an improved ink jet printhead having an ink inlet in one of its surfaces, a plurality of nozzles, individual channels connecting the nozzles to an internal ink supplying manifold, the manifold being supplied ink through said ink inlet, and selectively addressable heating elements for expelling ink droplets on demand, the improved ink jet printhead comprising:

a substantially flat filter having predetermined dimensions and being adhesively bonded to the printhead containing the ink inlet, so that the entire ink inlet is covered by the filter, the filter having a plurality of tapered pores therethrough formed by a laser ablation process.

The invention also relates to a method for fabricating a filter element to prevent contaminants from entering an ink supply inlet of an ink jet printhead, comprising the steps of:

positioning a thin polymer film in the output radiation path of an ablating laser, positioning a light transmitting system between the laser and the film, the system having a light transmitting pattern conforming to the desired hole size of the filter element, controlling the laser output so that slightly tapered holes are formed in portions of the polymer film, the portions conforming in size to the size of a desired filter element and bonding the filter element to the ink supply inlet.

DESCRIPTION OF THE INVENTION

Figure 1:
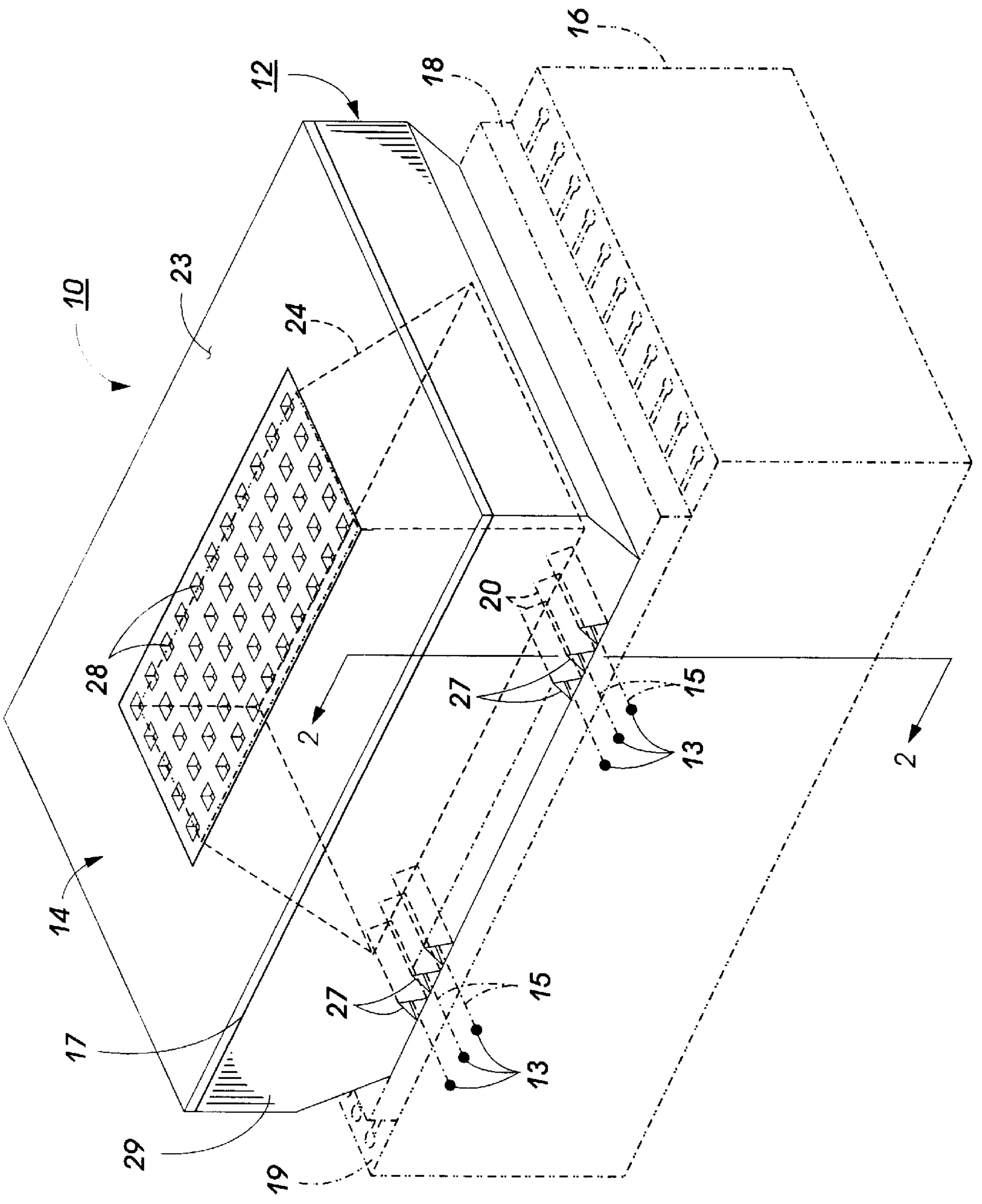
FIG. 1 is a schematic isometric view of an ink jet printhead module with a filter of the present invention bonded to the ink inlet.
Figure 2:
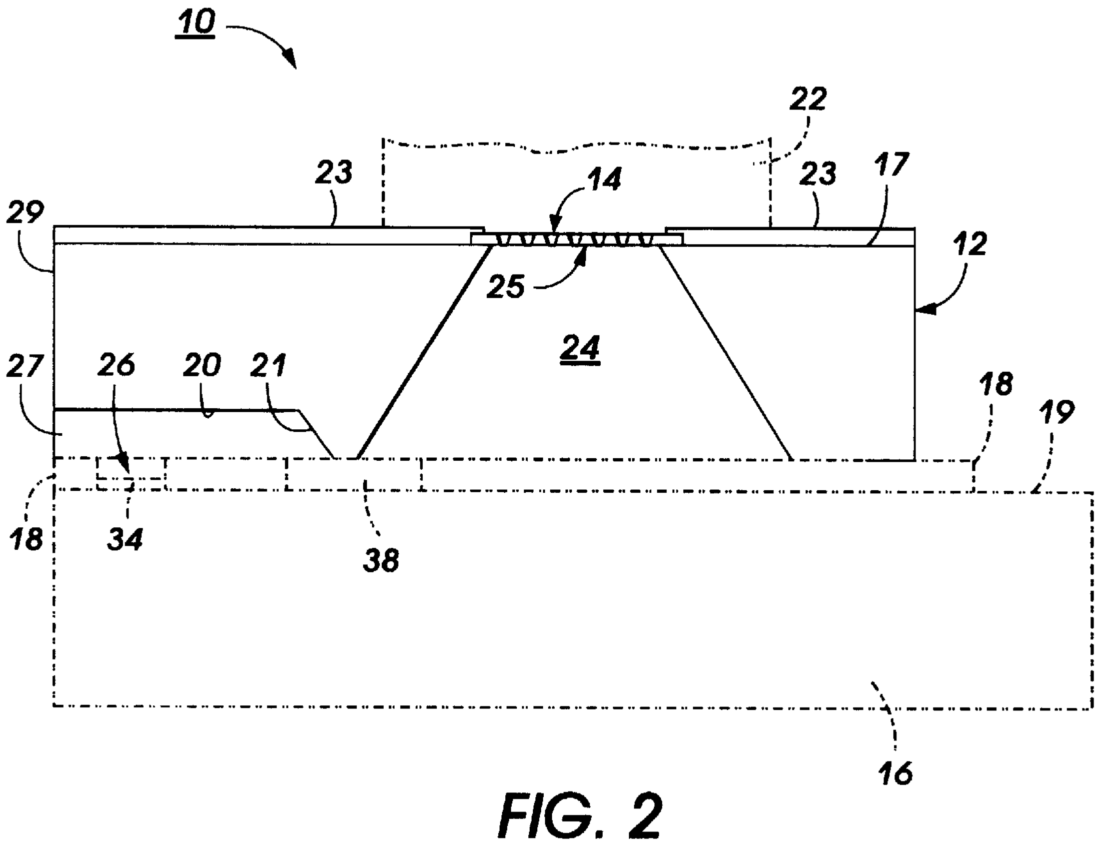
FIG. 2 is a cross-sectional view of the printhead of FIG. 1 further including an ink manifold in fluid connection with the ink inlet.

In FIGS. 1 and 2, a thermal ink jet printhead 10 fabricated according to the teachings of the present invention is shown comprising channel plate 12 with laser-ablated filter 14 and heater plate 16 shown in dashed line. A patterned film layer 18 is shown in dashed line having a material such as, for example, RISTON®, VACREL®, or polyimide, and is sandwiched between the channel plate and the heater plate. As disclosed in U.S. Pat. No. 4,774,530 to Hawkins and incorporated herein by reference in its entirety, the thick film layer is etched to remove material above each heating element 34, thus placing them in pits 26. Material is removed between the closed ends 21 of ink channels 20 and the reservoir 24, forming trench 38 placing the channels 20 into fluid communication with the reservoir 24. For illustration purposes, droplets 13 are shown following trajectories 15 after ejection from the nozzles 27 in front face 29 of the printhead.

Referring to FIG. 1, channel plate 12 is permanently bonded to heater plate 16 or to the patterned thick film layer 18 optionally deposited over the heating elements and addressing electrodes on the top surface 19 of the heater plate and patterned as taught in the above-mentioned U.S. Pat. No. 4,774,530. The channel plate is silicon and the heater plate may be any insulative or semiconductive material as disclosed in U.S. Pat. No. Reissue 32,572 to Hawkins et al. The illustrated embodiment of the present invention is described for an edge-shooter type printhead, but could readily be used for a roofshooter configured printhead (not shown) as disclosed in U.S. Pat. No. 4,864,329 to Kneezel et al., wherein the ink inlet is in the heater plate, so that the integral filter of the present invention could be fabricated in a similar manner. The description of FIGS. 8 and 9 of U.S. Pat. No. 4,864,329 is incorporated herein by reference.

Channel plate 12 of FIG. 1 contains an etched recess 24, shown in dashed line, in one surface which, when mated to the heater plate 16, forms an ink reservoir. A plurality of identical parallel grooves 20, shown in dashed line and having triangular cross sections, are etched (using orientation dependent etching techniques) in the same surface of the channel plate with one of the ends thereof penetrating the front face 29. The other closed ends 21 (FIG. 2) of the grooves are adjacent to the recess 24. When the channel plate and heater plate are mated and diced, the groove penetrations through front face 29 produce the orifices or nozzles 27. Grooves 20 also serve as ink channels which contact the reservoir 24 (via trench 38) with the nozzles. The open bottom of the reservoir in the channel plate, shown in FIG. 2, forms an ink inlet 25 and provides means for maintaining a supply of ink in the reservoir through a manifold from an ink supply source in an ink cartridge 22, partially shown in FIG. 2. The cartridge manifold is scaled to the ink inlet by adhesive layer 23.

Filter 14 of the present invention has been fabricated, in a first embodiment, and as discussed below, by laser-ablating holes 28 through a thin polymer film to form a fine filter and then adhesively bonding the filter to the fill hole side 17 of channel plate 12 by, for example, the adhesive transfer method disclosed in U.S. Pat. No. 4,678,529, whose contents are hereby incorporated by reference.

Figure 3:
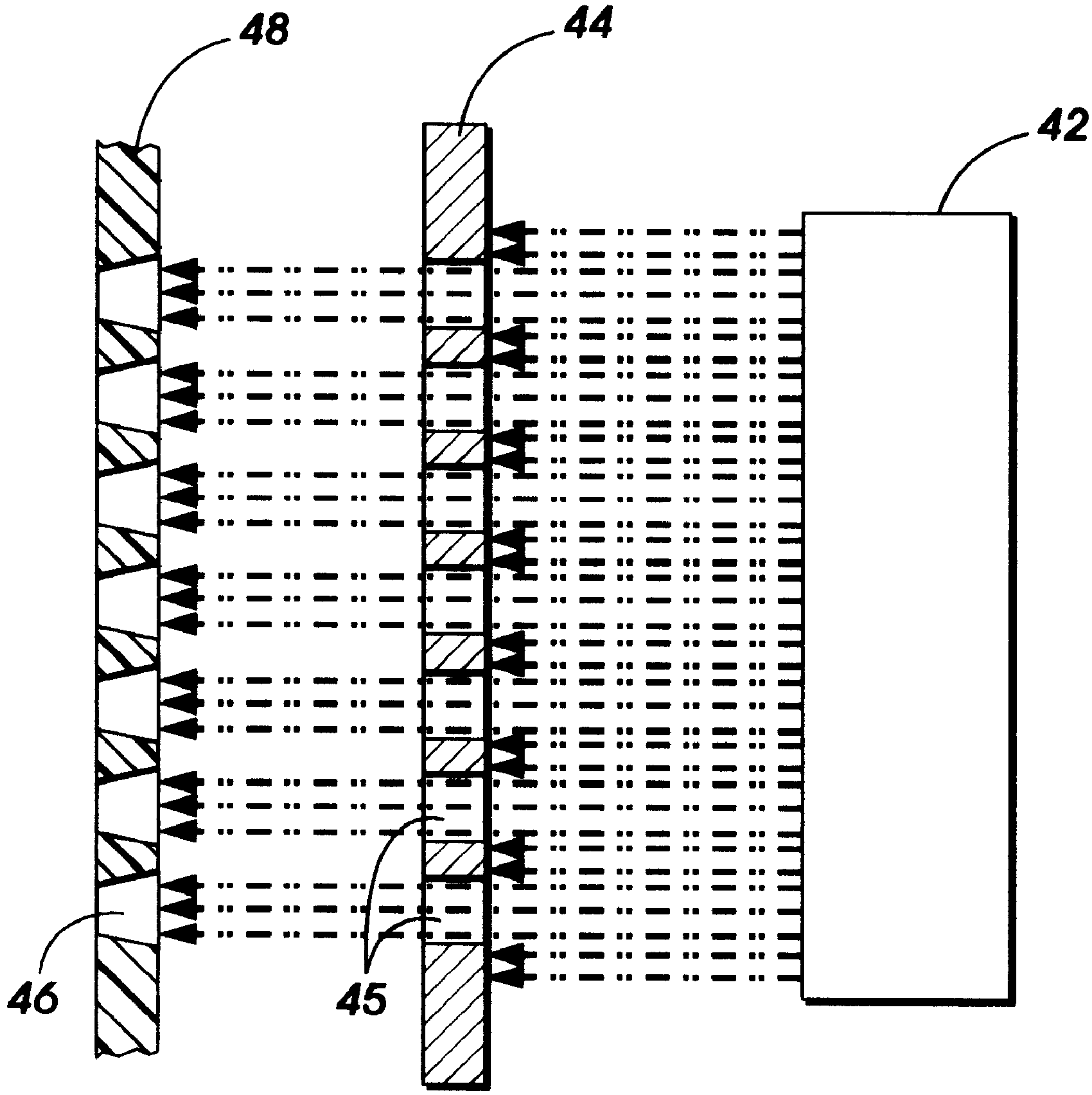
FIG. 3 shows laser ablation through a mask of a thin polymer film to form the filter of FIGS. 1 and 2.

Referring to FIG. 3, large diameter output beams are generated by excimer laser 42 and directed to a mask 44 having a plurality of holes 45, with total area sufficient to cover the ink inlet 25. The holes can be closely packed with diameters as small as 2.5 microns. The radiation passing through the mask 44 forms a plurality of tapered holes 46 in polymer film 48 which, in a preferred embodiment, is KAPTON®, or other polymer films which have been selected for chemical compatibility with the inks to be used. Ablated film 48 has thus been fabricated into filter 14 which can then be aligned with and laminated over inlet 25. The filter size must be large enough to provide an adequate seal across inlet 25 with enough edge surface to allow adhesive layer 23 to be bonded to the edges. Additional filters are formed by a step and repeat process. In a preferred embodiment, film 48 is 20 microns thick, holes 46 are 5 microns diameter with a 5° taper. (The tape is exaggerated in the Figures for descriptive purposes.) Furthermore, in a preferred embodiment, the film is approximately the size of the channel wafer, and it contains a series of ablated holes corresponding to the ink inlets of the plurality of die on the wafers.

Figure 4:
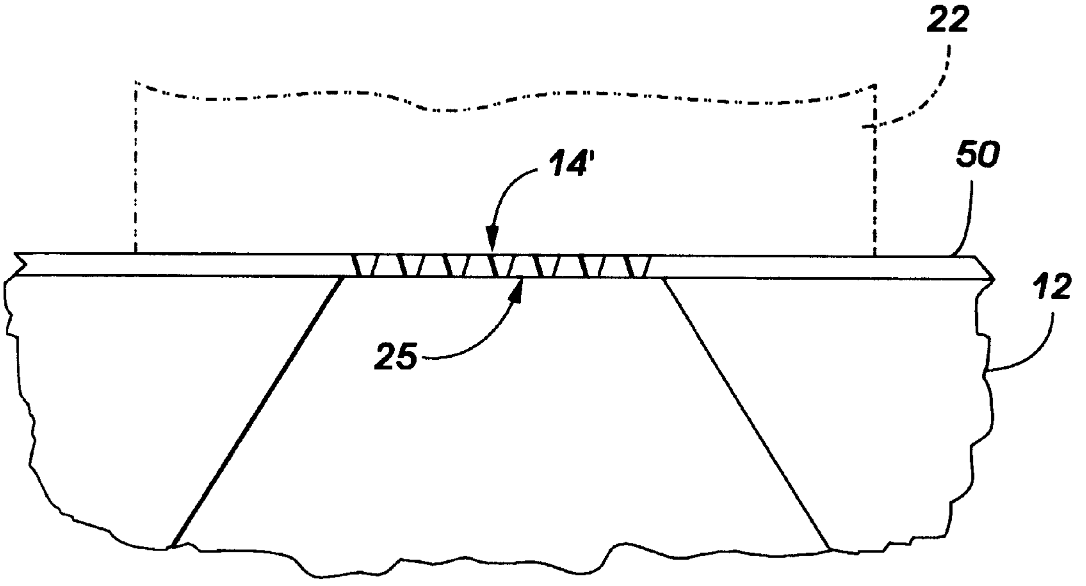
FIG. 4 is a cross-sectional end view of the printhead of FIG. 1 modified so that the filter is formed in a seal tape.
Figure 5:
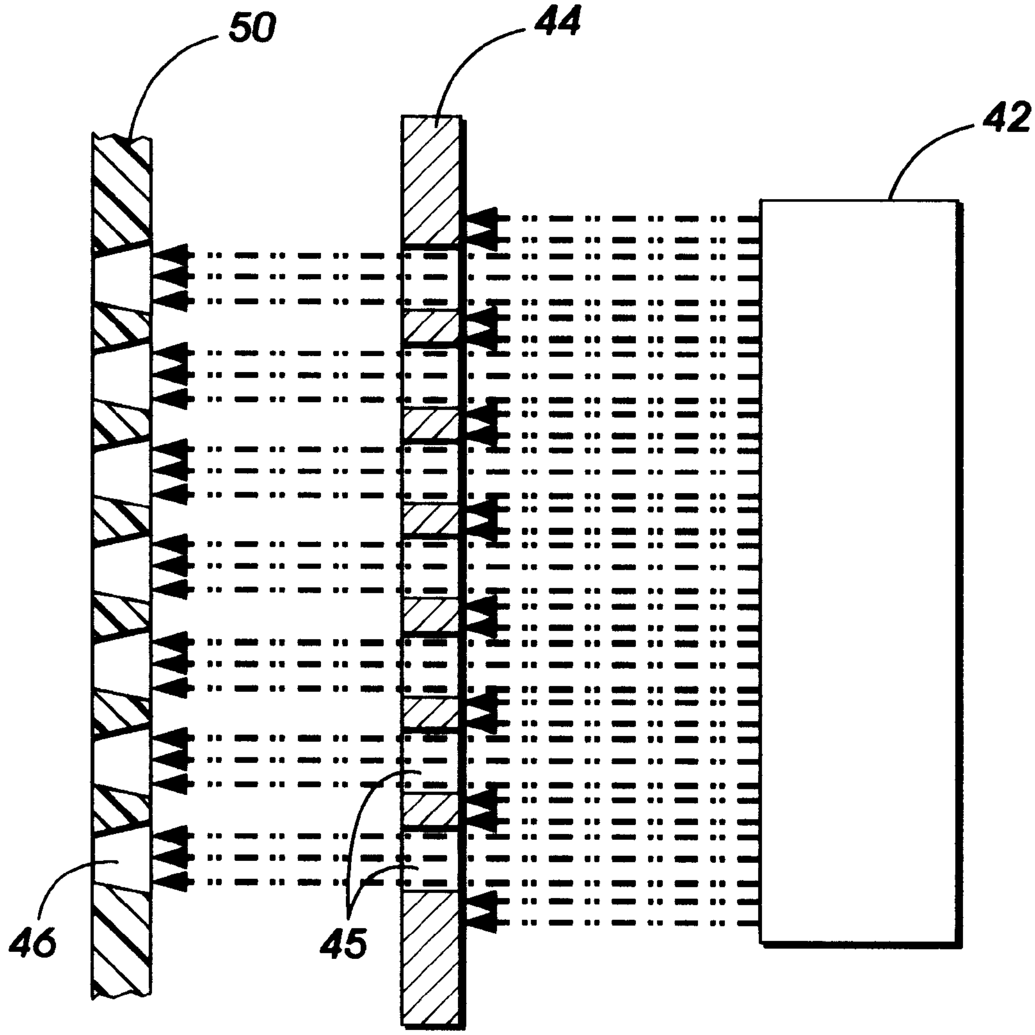
FIG. 5 shows laser ablation through a mask of a seal tape to form the filter of FIG. 4.

In a second embodiment, shown in FIGS. 4, 5, a tape seal 50 is used to seal the cartridge manifold to the ink inlet. Seal 50 is ablated by the above-described process to form the filter 14', as well as the outline of the seal. The tape seal is then aligned with inlet 25 and bonded to the top surface of channel plate 12.

Figure 6:
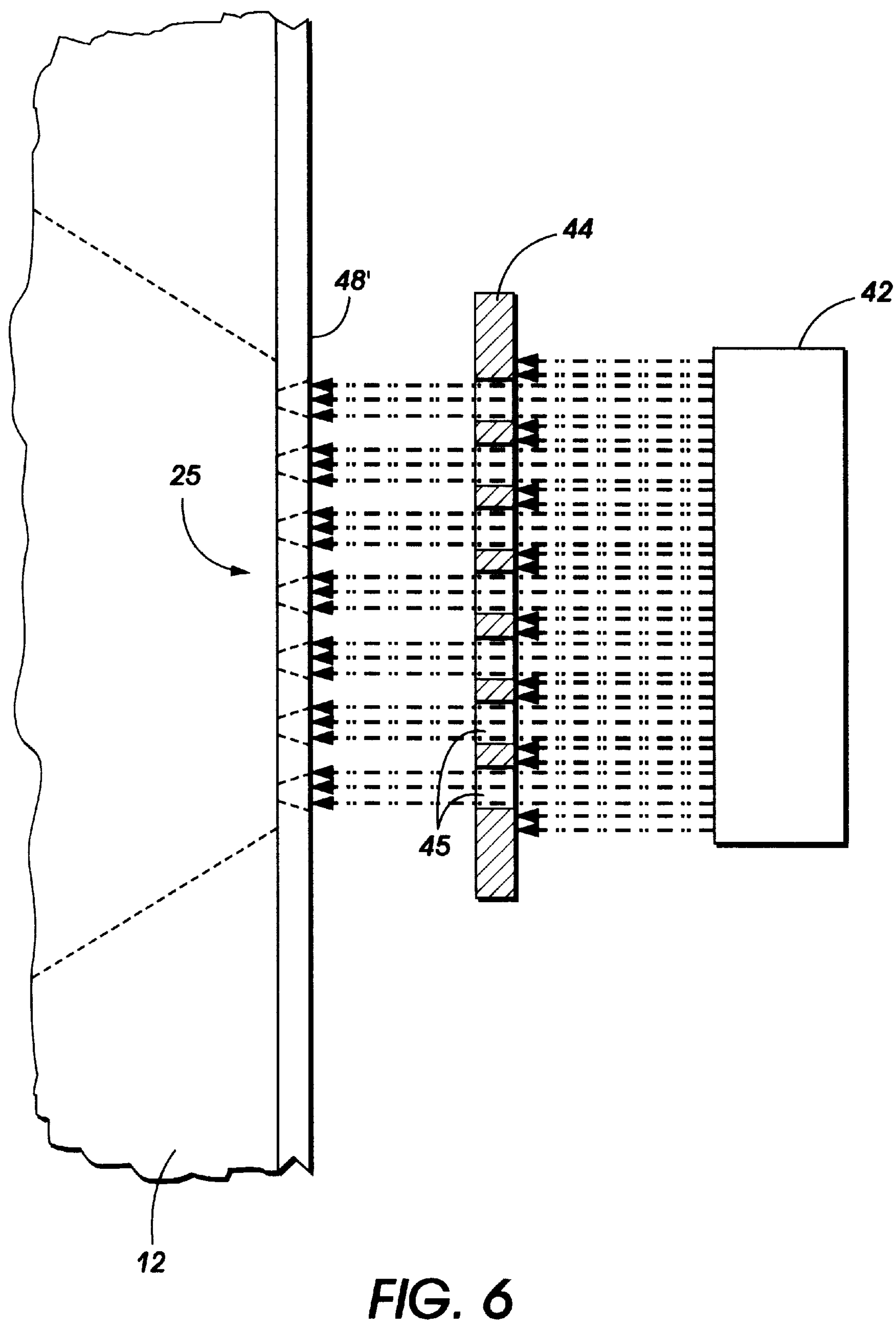
FIG. 6 shows the laser ablation through a mask of the polymer film already bonded to the channel plate of the printhead.

In a third embodiment, shown in FIG. 6, polymer film 48' is first laminated to channel plate 12 and the wafer is diced into separate printheads. Each printhead is then positioned so that the channel plate top surface is aligned with the desired masking radiation pattern to fabricate filter 14.

Figure 7:
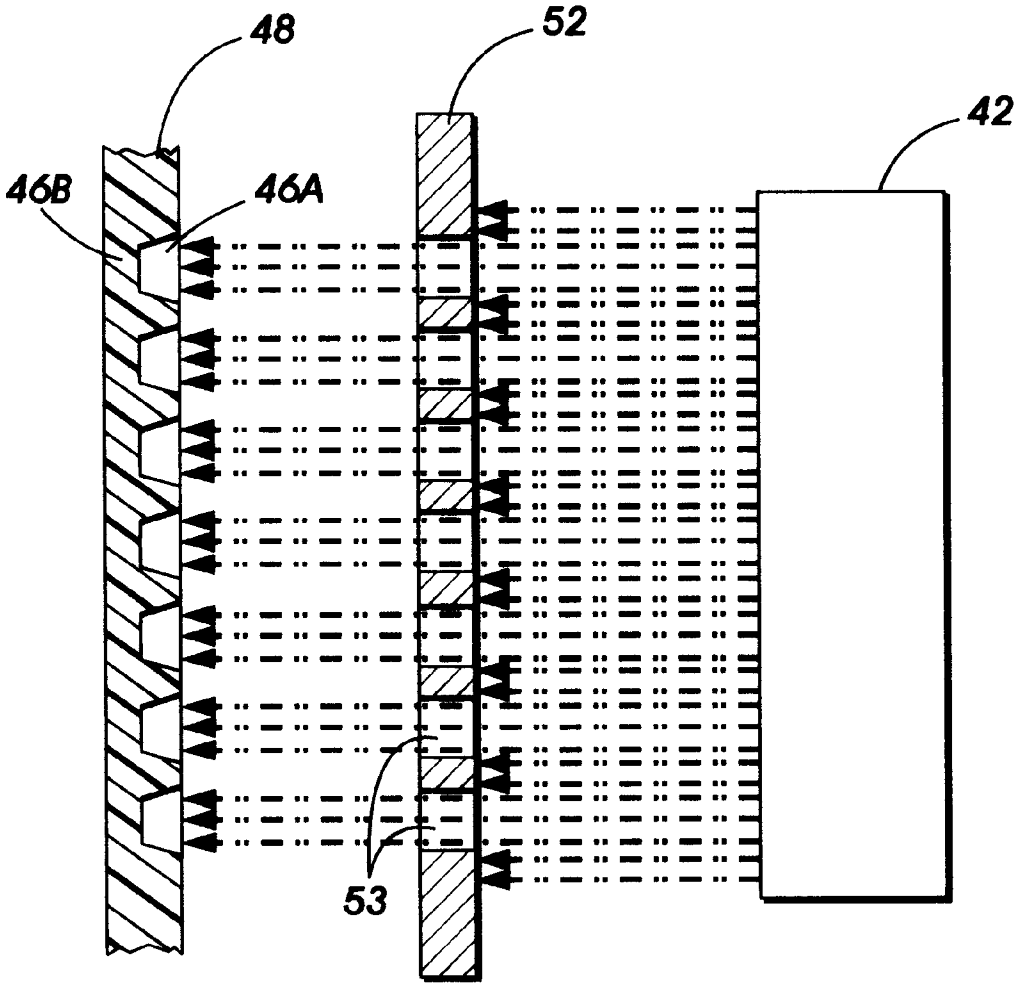
FIG. 7 shows laser ablation through a first mask to form partial hole ablation of a polymer film.
Figure 8:
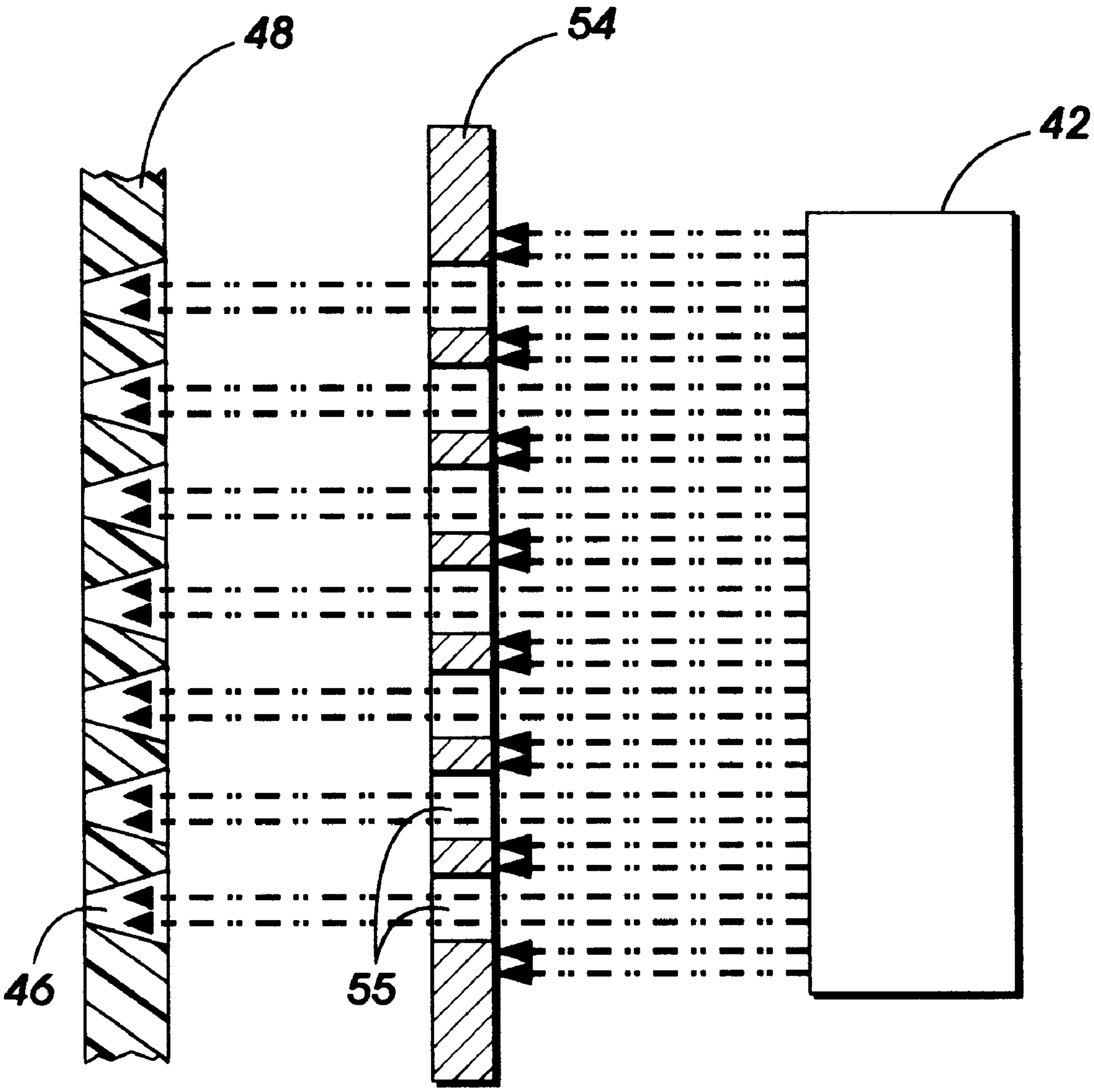
FIG. 8 shows laser ablation through a second mask to complete laser hole ablation of the film forming the final filter.

In a fourth embodiment, a variation of FIGS. 1 and 2 is shown in FIGS. 7 and 8. For this embodiment, exposure is accomplished using a first mask 52 placed between laser 42 and film 48. Mask 52 has holes 53 which are relatively larger than the holes in mask 44 shown in FIG. 2 and larger than the desired filter pore size. An exposure through mask 52 is controlled so that the hole ablation is only partial leaving recesses 46A with a bottom base 46B. The partially ablated film 48 is then further ablated by inserting a second mask 54 with smaller holes 55 and completing laser ablation of holes 46. This embodiment further reduces the flow resistance while maintaining the minimum pore size and maximum film thickness. Depending on the hole size, multiple small diameter holes could be formed within each larger, partially ablated hole or section formed by mask 52.

A rectangular array can produce about 25% open area and a rectangular close-packed array can produce a filter with ≧50% open area. Such large open area filters having small pore sizes (≦12 μm) are advantageous over other methods in protecting against small particles entering the channels and minimizing flow impedance.

While the embodiments disclosed herein are preferred, it will be appreciated from this teaching that various alternative, modifications, variations or improvements therein may be made by those skilled in the art, which are intended to be encompassed by the following claims: For example, in an embodiment not shown, the filters are applied to one die module at a time, rather than on a wafer scale. This is the more general case of the second embodiment, in which the filter may not be the same member that forms the fluid seal to the manifold.

Although the examples shown in the figures correspond to die module types in which the channels and ink inlets are formed by orientation dependent etching, other fabrication methods for the fluidic pathways are compatible with the laser ablated filter described herein.

And, although the laser ablation, in the preferred embodiment, is accomplished through a mask, alternate light transmitting systems may be used such as, for example, diffraction optics displays or a microlens elements.

What is claimed is:

1. A method for fabricating a filter element to prevent contaminants from entering an ink supply inlet of an ink jet printhead, comprising the steps of:

positioning a thin polymer film in the output radiation path of an ablation laser, positioning a first mask between the laser and the film, the mask having a hole pattern having larger hole diameters than the desired hole size of the filter element, controlling the laser output so that slightly tapered cavities are formed in a portion of the polymer film, the portion conforming in size to the size of the filter element, positioning a second mask between the laser and the film, the second mask having a hole pattern sized to create the desired hole size of the filter element, controlling the laser output so that the laser output is directed into said cavities forming a plurality of tapered holes through the base of each said cavity forming the filter element and bonding the filter element to the ink supply inlet.

2. A method for fabricating a filter element to prevent contaminants from an ink manifold entering an ink inlet of a printer, comprising the steps of:

positioning an adhesive tape in the output radiation path of an ablation laser, positioning a light transmitting system between the laser and the tape, the system having a light transmitting pattern conforming to the desired hole size of the filter element, controlling the laser output so that slightly tapered holes are formed in a portion of the tape forming the filter element, the portion conforming in size to the size of the filter element and applying one surface of the tape over the ink inlet and the other surface to the ink manifold to provide a seal between the manifold and an ink inlet periphery and also to provide a filter between the manifold and the ink inlet.

* * * * *